(12) United States Patent
Van Someren et al.

(10) Patent No.: US 7,227,833 B2
(45) Date of Patent: Jun. 5, 2007

(54) WRITING SCHEME FOR AN OPTICAL RECORDING MEDIUM

(75) Inventors: Bob Van Someren, Eindhoven (NL); Willem Marie Julia Marcel Coene, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 51 days.

(21) Appl. No.: 10/509,233

(22) PCT Filed: Mar. 5, 2003

(86) PCT No.: PCT/IB03/00879

§ 371 (c)(1),
(2), (4) Date: Sep. 24, 2004

(87) PCT Pub. No.: WO03/083848

PCT Pub. Date: Oct. 9, 2003

(65) Prior Publication Data

US 2005/0147020 A1 Jul. 7, 2005

(30) Foreign Application Priority Data

Mar. 29, 2002 (EP) .................................. 02076255

(51) Int. Cl.
*G11B 7/24* (2006.01)
*G11B 5/09* (2006.01)

(52) U.S. Cl. .................. 369/275.4; 369/59.24

(58) Field of Classification Search ...................... None
See application file for complete search history.

(56) References Cited

U.S. PATENT DOCUMENTS 5,337,301 A * 8/1994 Sugiura et al. ........ 369/110.02
5,455,815 A * 10/1995 Ishida et al. ............. 369/53.29
5,553,038 A * 9/1996 Spruit et al. ............. 369/13.24
5,557,592 A * 9/1996 Kobayashi et al. ...... 369/47.27
5,729,518 A * 3/1998 Kobayashi ............... 369/59.23
5,886,969 A * 3/1999 Maeda et al. ............... 369/100
2002/0021643 A1 2/2002 Hiroshi et al.

FOREIGN PATENT DOCUMENTS

| EP | 0484132 A | | 5/1992 |
|---|---|---|---|
| EP | 0502582 A | | 9/1992 |
| EP | 0553573 A | | 8/1993 |
| EP | 0633566 | | 1/1995 |
| GB | EP 0484132 A | * | 5/1992 |
| GB | EP 0553573 A | * | 8/1993 |

* cited by examiner

*Primary Examiner*—William Korzuch
*Assistant Examiner*—Parul Gupta
(74) *Attorney, Agent, or Firm*—Michael E. Belk

(57) ABSTRACT

A writing scheme for writing an information to an optical recording medium by forming mark areas, e.g. pit areas, corresponding to a predetermined state of said information on a recording surface of said optical recording medium. The writing scheme is adapted to modulate the shape of said mark areas in a predetermined manner so as to obtain incomplete mark areas which do not fully cover the size which is allocated to the channel bit to be written. The incomplete mark areas may be obtained by modulating their shape in any manner suitable to reduce the reflection surface and/or to increase diffraction. Additionally, a multi-level modulation or a binary modulation may be achieved by controlling the shape or number of the incomplete mark areas, respectively, in accordance with the level of a multi-level coded information.

22 Claims, 8 Drawing Sheets

WRITING SCHEME FOR AN OPTICAL RECORDING MEDIUM

The present invention relates to a method and apparatus for writing on an optical recording medium, e.g. an optical disc or card, using multi-dimensional coding. This writing scheme could be used for providing a multi-level coding function.

Both magnetic and conventional optical data storage technologies, where individual bits are organized along tracks of a 1-dimensional (1-D) character, and which are stored as distinct magnetic or optical changes on the surface of a recording medium, are approaching physical limits beyond which individual bits may be too small or too difficult to store. Storing information throughout the surface of a medium—not just along 1-D tracks—offers an intriguing high-capacity alternative.

FIG. 1 shows typical coding and signal processing elements of a data storage system. The cycle of user data from input DI to output DO can include interleaving 10, error-correction-code (ECC) and modulation encoding 20, 30, signal preprocessing 40, data storage on the recording medium 50, signal pick-up and post-processing 60, binary detection 70, and decoding 80, 90 of the interleaved ECC. The ECC encoder 20 adds redundancy to the data in order to provide protection from various noise sources. The ECC-encoded data are then passed on to a modulation encoder 30 which adapts the data to the channel, i.e. it manipulates the data into a form less likely to be corrupted by channel errors and more easily detected at the channel output. The modulated data, i.e. channel bits, are then input to a writing or mastering device, e.g. a spatial light or electron beam modulator or the like, and stored on the recording medium 50, e.g. optical disc or card. On the receiving side, a reading device or pick-up unit comprising e.g. a partitioned photodetector, or an array of detectors, which can be 1-D or even 2-D as in a charge-coupled device (CCD), converts the received radiation pattern reflected from the recording medium 50 into pseudo-analog data values which must be transformed back into digital data (typically one bit per pixel for binary modulation, but $\log_2(M)$ bits per pixel for multi-level, or M-ary modulation). Thus, the first step in this reading process is a detection and post-processing step 60 comprising an equalization step which attempts to undo distortions created in the recording process. The equalization step can be carried out in the pseudo-analog domain. Then the array of pseudo-analog values is converted to an array of binary digital data via a detector 70. The array of digital data is then passed first to the modulation decoder 80, which performs the inverse operation to modulation encoding, and then to an ECC decoder 90.

Interpixel or intersymbol interference (ISI) is a phenomenon in which the signal waveform at one particular pixel is contaminated by data at nearby pixels. Physically, this arises from the band-limit of the (optical) channel, originating from optical diffraction, or from time-varying aberrations in the optical pick-up system, like disc tilt and defocus of the laser beam. An approach to combating such an interference is to forbid certain patterns of high spatial frequency via the modulation coding. A code that forbids a pattern of high spatial frequency (or, more generally, a collection of such patterns of rapidly varying 0 and 1 pixels) is called a low-pass code and can be used for modulation coding/decoding at the modulation encoder 30 and decoder 80. Such modulation codes constrain the information written in a two-dimensional area (like in the allowed pages of a holographic storage) to have limited high spatial frequency content. Another property of these 2-D codes is the increase in the eye-opening of the (digital) eye-pattern.

Two-dimensional codes with low-pass filtering characteristics are of interest as modulation codes for novel two-dimensional and/or volumetric optical recording schemes. But 2-D coding can also be a key issue for new routes that are closer to more conventional types of optical recording, e.g. based upon reflective optical disc technology, using coherent diffraction of two-dimensional patterns (marks) recorded on a two-dimensional area of a card or a disc. In the prior art, coding on square lattices has been considered. In particular, the capacity of checkerboard codes has been studied in W. Weeks, R. E. Blahut, "The Capacity and Coding Gain of Certain Checkerboard Codes", IEEE Trans. Inform. Theory, Vol. 44, No. 3, 1998, pp 1193–1203. There, various checkerboard constraints have been considered on a square lattice to achieve a low pass characteristic and thus reduce the effects of inter-symbol interference (ISI) during read-out and detection of channel bits.

In 2-D optical data storage, effects (e.g. pits or lands) are written in such a manner that the information content results not only from the correlations of the effects in the tangential direction of a disc as in the case of 1-D optical storage, but also from the correlations between effects written in the radial direction. Thus, the 2-D area of the recording medium is fully exploited. In other words, the specific filling of sites on a 2-D grid determines the information content of the information layer.

As an example, a 2-D coded medium can be arranged as a hexagonal grid representing positions of the channel bits. The channel bits are formed as pit regions or pit effects and land regions or land effects arranged on predetermined surface areas of the optical medium. In contrast to a 2-D coding on square lattices, the hexagonal coding geometry may lead to more efficient storage, and thus higher storage densities can be achieved.

However, there is a bit-detection problem in 2-D coding, which is typical for coherent signal generation. FIGS. 2A and 2B show a schematic view of a 2-D hexagonal grid comprising a plurality of channel bit areas (represented by hexagons for simplicity), wherein white areas indicated land effects and shaded areas indicated pit effects. Thus, in FIG. 2A, a radiation spot LS of the pick-up unit used for reading the information stored or written on the optical medium is fully reflected at the continuous large land portion (e.g. at zero level) formed by adjacent land effects. Similarly, as indicated in FIG. 2B, a large pit portion (e.g. below zero level) may be formed by adjacent pit effects. However, the reflection signals from the large land portion, i.e. mirror portion at zero-level, and from the large pit portion, i.e. mirror portion below zero-level (e.g. at depth of around or equal to $\lambda/4$, where $\lambda$ denotes the wavelength of the radiation used for reading, adapted for the index of refraction n of the material used for the substrate layer of the disc), are completely identical. Thus, the two binary levels cannot be distinguished at detection. The above problem may occur in 2-D coding, since there is no diffraction at all for a focused laser or other radiation spot which is incident on a large pit area or on a large land area, as shown in FIGS. 2A and 2B. Both behave as ideal mirrors. In particular, a specific pit effect may be surrounded not only by six neighbouring pit effects but also by next-nearest neighbour pit effects, which results in signals that are similar for large pit-areas and large land-areas, an effect that is commonly known as folding.

As shown in FIG. 3, such a folding effect may also occur in 1-D coded optical media, in case pit effects (shaded areas) are written too wide in the direction perpendicular to the recording direction or track (indicated by an arrow in FIG. 3). Furthermore, this problem of signal folding may also occur when reading for instance a CD disc with large pits with an optical pick-up unit used in a DVD-drive (without further deterioration of the spot quality, by e.g. lowering of the Numerical-Aperture, NA), due to the fact that the CD-pits are much too wide for the resolving power of the DVD laser. The enlarged pit effect leads to a considerably reduced diffraction in the radial direction, and thus to a considerable reflection or signal level of the radiation beam, as shown by a respective peak (indicated by the dotted arrow) in the signal diagram in the lower part of FIG. 3. This signal diagram schematically indicates a time-dependent level of the output signal of the pick-up unit, when the radiation spot moves along the track direction.

In the recording of 1-D encoded data, folding can easily be prevented by taking care that the width of the pit effects is kept within an acceptable range. Then, the folding problem does not arise because the spot diameter is always larger than the radial width of a pit effect and diffraction always occurs in the radial direction. The reflected light beam therefore looses enough intensity by diffraction outside the central aperture.

In 2-D coding schemes, large areas of channel bits of the same type conventionally have been avoided by introducing a high-pass constraint of the 2-D channel or modulation code. This constraint can be realized by a single parameter leading to high-pass characteristics of the 2-D code. In particular, the parameter may indicate the minimum number of nearest neighbours that must be of the opposite bit type or bit state compared to the bit value of the channel bit at the central site of a cluster. Thereby, the number of pit effects adjacent to any one pit effect on the medium can be controlled. However, such a high-pass constraint leads (for identical physical dimensions of the hexagonal lattice) to a loss of user data density which can be written on the 2-D coded recording medium.

It is therefore an object of the present invention to provide an improved writing scheme by means of which user data density can be increased in multi-dimensional coded optical recording media.

This object is achieved by a writing method as defined in claim 1, by an apparatus as defined in claim 16, and by a record carrier as defined in claim 19.

According to the invention, the folding problem can be prevented or alleviated during the writing or mastering process by realizing marks, e.g. pit effects, as incomplete marks, which do not form large mirror surfaces when combined in clusters of adjacent pits. The incomplete marks may be obtained by modulating the shape of pit effects in any manner suitable to reduce the reflection surface and/or to increase diffraction. Additionally, a multi-level coded information can be written by controlling the shape or size of a single incomplete mark in a predetermined cluster in accordance with the level of a multi-level coded information. Furthermore, the multi-level coded information may be written by using a binary modulation, i.e. by forming a cluster pattern of incomplete marks on each channel bit area and controlling the pattern in accordance with the level of the multi-level coded information, similar to a dithering process.

Other advantageous further developments are defined in the dependent claims.

In the following, a preferred embodiments of the present invention will be described in greater detail with reference to the accompanying drawing figures in which.

The preferred embodiments of the present invention will now be described on the basis of 2-D coding scheme in which a quasi-hexagonal lattice is used.

It is known in crystallography that hexagonal lattices provide the highest packing fraction. For instance, its packing fraction is $1/\cos(30°)=1.155$ better than that of a square lattice with the same distance a between nearest-neighbour lattice points. The latter distance a may be determined by the extent of a two-dimensional impulse response of the two-dimensional channel used for writing to the optical medium e.g. by conventional reflective-type of optical recording with coherent diffraction in two-dimensions.

Another advantage of using an hexagonal lattice compared to the use of a square lattice, is the most critical spatial frequency of lattice bit-planes in these two lattices. The most critical frequencies are the diagonal lattice planes. When using a criterion that this most critical frequency is just at the cut-off frequency of the channel transfer function (MTF) of the optical channel, the size of a user bit on the disc can be identified. Using this criterion of the most critical frequency at the cut-off of the channel, for simplicity for the uncoded 2-D modulation case, for the hexagonal lattice, the size of a user bit amounts to $S_{H,L}=1/(2\sqrt{3}) [\lambda(2 NA)]^2$, whereas for the square lattice, the size of a user bit amounts to $S_{S,L}=\frac{1}{2}[\lambda(2 NA)]^2$. This represents a factor of 73.2% higher efficiency for the hexagonal lattice than for the square lattice.

Figure 1:
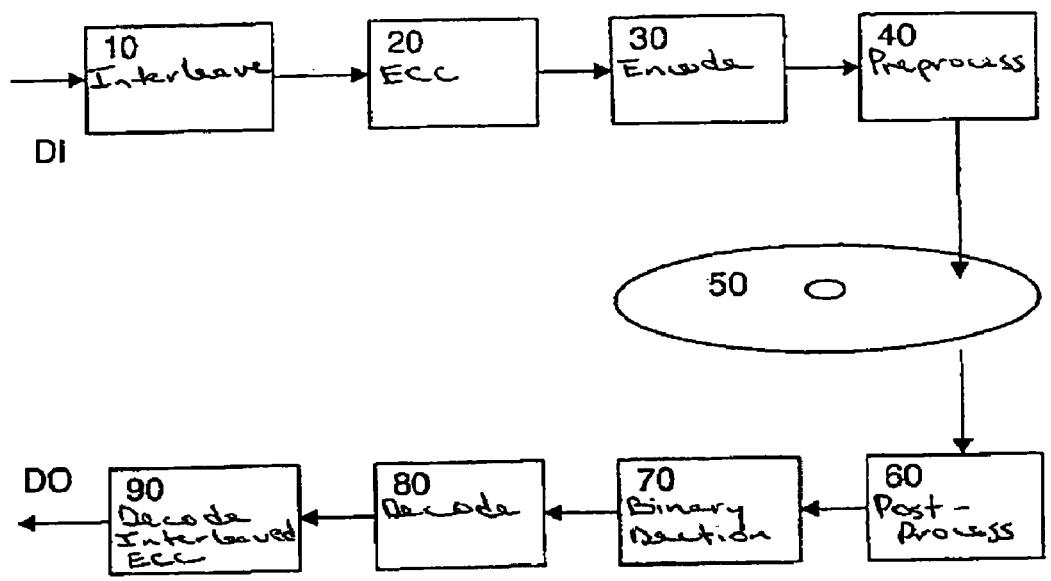
FIG. 1 shows a schematic diagram of coding and processing elements of a data storage system in which the present invention can be applied.
Figures 2A, 2B:
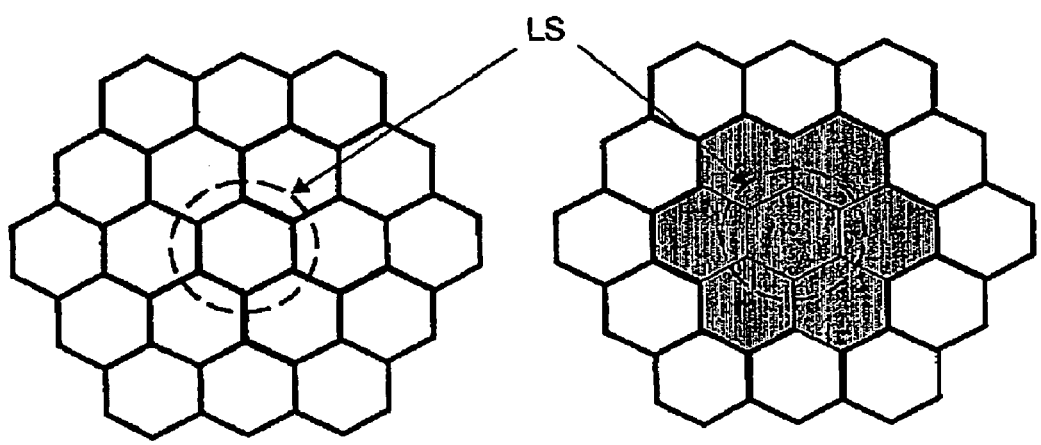
FIGS. 2A and 2B show examples of large bit and land portions, respectively, formed in a hexagonal grid of channel bit positions in a 2-D coded recording medium.
Figure 3:
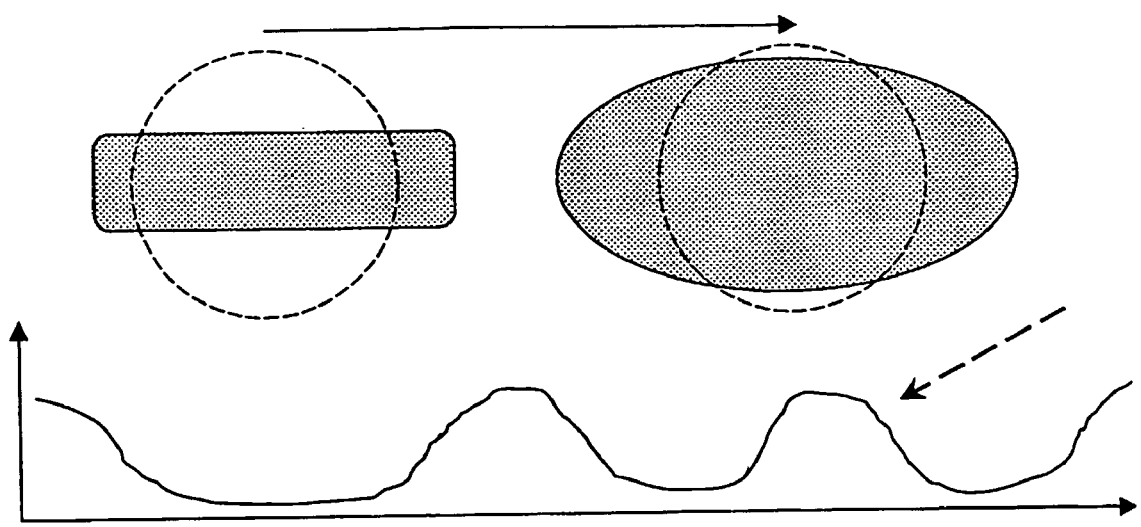
FIG. 3 shows a folding effect as generated due to an enlarged pit in a 1-D coded recording medium.

According to the present invention, the problem of reduced diffraction or increased reflection at large pit portions is alleviated or removed by a new form of write strategy, where the shape of the pit areas or effects is modulated in a predetermined manner during the writing or mastering operation of the optical medium, e.g. optical disc or card, so as to obtain an incomplete pit effect as compared to the size or shape of the land effect. In general, the pit shape is modulated in such a manner that the level of a read-out signal reflected at the incomplete pit effect and received at the pick-up unit is reduced. This can be achieved in various ways. On the one hand, the width or shape of the pit effect can be changed such that a cluster of adjacent pit effects as shown in FIG. 2B does not lead to a large mirror portion but to a number of smaller pits or pits with an irregular shape, separated by remaining land portions by which the signal generated by the read-out radiation beam is reduced, since the read-out radiation beam is diffused or diffracted (in a plurality of directions). On the other hand the bottom surface of the pit effects can be modulated e.g. by introducing one or a plurality of protrusions, e.g. pillars, or holes or any other regularities or irregularities, by which the reflection of the read-out radiation beam is reduced or by which the read-out radiation beam is diffused or diffracted.

Figure 4:
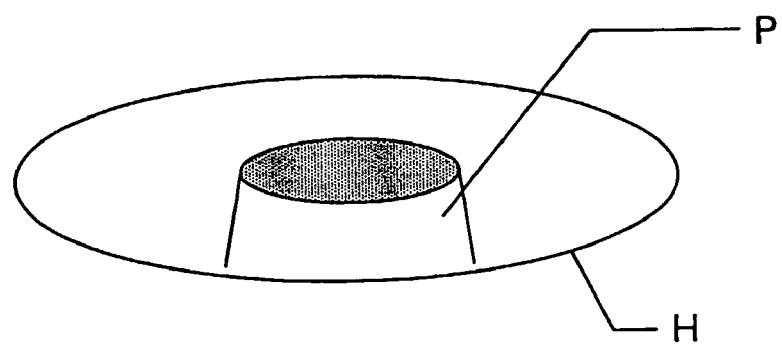
FIG. 4 shows an incomplete pit effect with a pillar in a substantially central portion according to a first preferred embodiment of the present invention.

FIG. 4 shows a schematic view of an incomplete pit effect according to a first preferred embodiment, wherein a cylindrical pillar P is formed substantially in the central portion of the respective pit effect. The top of the pillar P forms a land area left over. In the present case, the edge H of the remaining land area has a circular shape. However, the edge H may as well have any other almost circular shape.

The incomplete pit effect with the pillar P in the center prevents folding in case of too many adjacent pit effects in 2-D coding according to FIG. 2B. It should be noted that the hexagons in FIG. 2 reflect the separate bit cells, but that the large mastered pit of FIG. 2B will have an almost circular boundary. The pillars P lead to a diffraction of the incident radiation, e.g. laser light, mostly outside the pupil or lens of the detection system at the pick-up unit. Thereby, the intensity of the central aperture signal is reduced when the radiation beam is incident on large pit areas. In case of pit effects with less than six pit neighbors, the size of the pillar P can be adjusted so as to substantially keep constant the degree of modulation of the read-out signal. In this sense, more complex write strategies can be devised, which depend on the bits written in adjacent bit-cells, and which aim, for instance, to keep the characteristics of the total channel (write-channel+read-channel) such that a linear channel transfer function is achieved as much as possible.

The mastering of such an incomplete pit effect can be done, for example, by means of a kind of hollow-cone electron beam or by means of a high resolution writing beam scanned according to the shape of the pit effect, e.g. in a circle, to write the pit effect with the pillar P substantially in the center. For such a writing or mastering operation, a writing equipment, e.g. an electron beam mastering equipment, is required preferably with a resolution of at least four times the resolution of the read-out equipment.

In case of the two-dimensional coding, full-sized hexagonal clusters arranged in the bulk of the hexagonal lattice have seven bit positions or sites, one central site and six nearest-neighbouring sites. For reasons of simplicity, the terminology "hexagonal cluster" is used, also when reference is made to a quasi-hexagonal cluster of bits on a quasi-hexagonal lattice.

Figure 5:
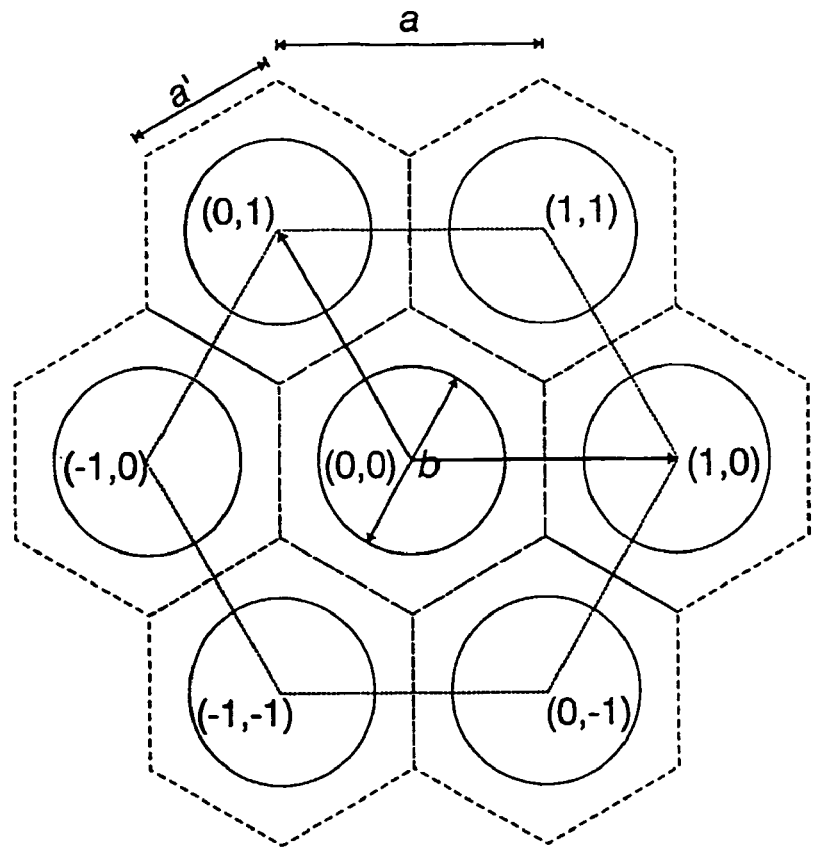
FIG. 5 shows the hexagonal lattice which is an ordering pattern of pit areas in a hexagonal 2-D coding scheme.

FIG. 5 shows an ordering pattern for describing the locations of incomplete pit effects in the hexagonal cluster with respective location vectors (n,m), wherein the parameters n and m may be set to the values "−1", "0" or "1". As an example, according to FIG. 5, the location vector (0,0) designates the central pit effect. The parameter n indicates the horizontal location and the parameter m indicates the vertical location. Furthermore, a side length a' of the hexagon, a diameter b of a pillar or hole portion, and the distance a between nearest-neighbour lattice points are indicated in FIG. 5, wherein $$a' = \frac{a}{\sqrt{3}}$$

and the channel bit surface area $$S_{2D} = \frac{3\sqrt{3}}{2}(a')^2 = \frac{\sqrt{3}}{2}a^2.$$

Figure 6A:
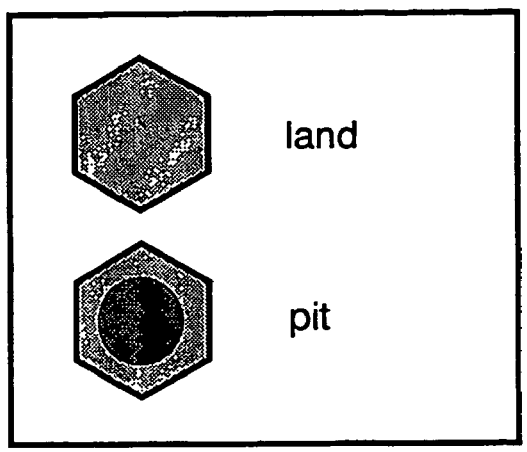
FIGS. 6A shows a writing scheme for land and pit effects, wherein an incomplete pit effect is formed as a circular pit hole in a substantially central portion of the corresponding pit area in a substantially central portion, according to a second preferred embodiment of the present invention.

FIG. 6A shows schematic top views of a land effect and an incomplete pit effect according to an example of the write scheme of the present invention. In the first preferred embodiment, the dark circular portion of the incomplete pit effect indicates the pillar P.

Figure 6B:
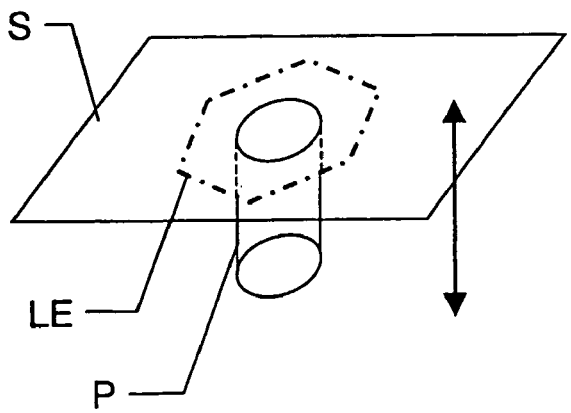
FIG. 6B shows a perspective view of the incomplete pit effect according to the second preferred embodiment.

Alternatively, according to a second preferred embodiment, the dark circular portion may as well represent a small circular pit hole arranged in a substantially central portion of the channel bit area allocated to the pit effect. Thus, the incomplete pit effect is formed by a remaining edge portion at land level and a central pit hole with a lower bottom level. FIG. 6B shows a perspective view of the incomplete pit effect, wherein the arrow indicates the depth of the pit hole, i.e. the distance between the land level and the lower pit level. It is clear that such a pit hole surrounded by the remaining land level also leads to a reduced reflection in case a plurality of such incomplete pit effects are arranged adjacent each other in a cluster.

As an advantageous modification of the present invention, the size or shape of the incomplete pit effects according to the first or second preferred embodiment may be varied in a systematic way so as to write a multi-level coded information. Thus, the write strategy of the present invention can be used to provide a multi-level coding of information. During the read-out operation, the level of reflection of the radiation beam at each bit, which leads to a signal value out of a plurality of values, is decoded to obtain a corresponding level of the multi-level coded information. It should be noted that this plurality of values are the multi-level values that were aimed at the encoder side. These values are further affected by noise, and by intersymbol-interference.

In other words, each single incomplete pit effect may be used for writing information from a set of user bits (log2 (M)) via a multi-level coding. Thus, the shape or size of the pillar or hole portion of each single pit effect is controlled in accordance with the level of the multi-level coded information to be written. Thereby, the reflection level at each individual pit effect can be controlled to write the different levels of the multi-level coded information.

Figure 7:
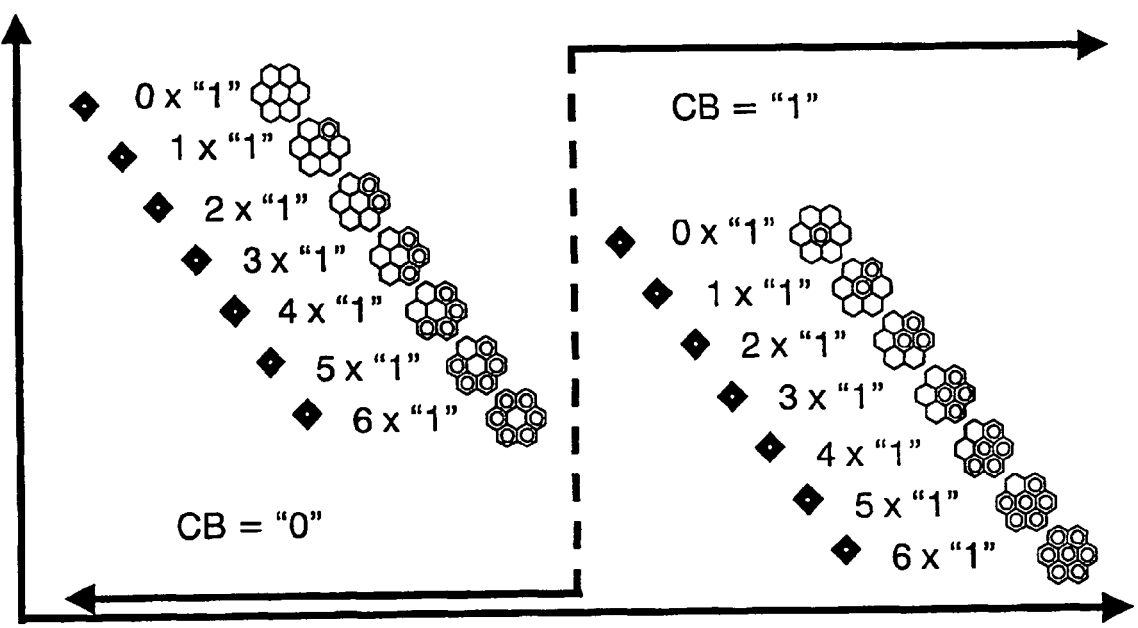
FIG. 7 shows a schematic diagram indicating signal levels to be expected for binary modulation at a certain disc capacity.
Figure 8:
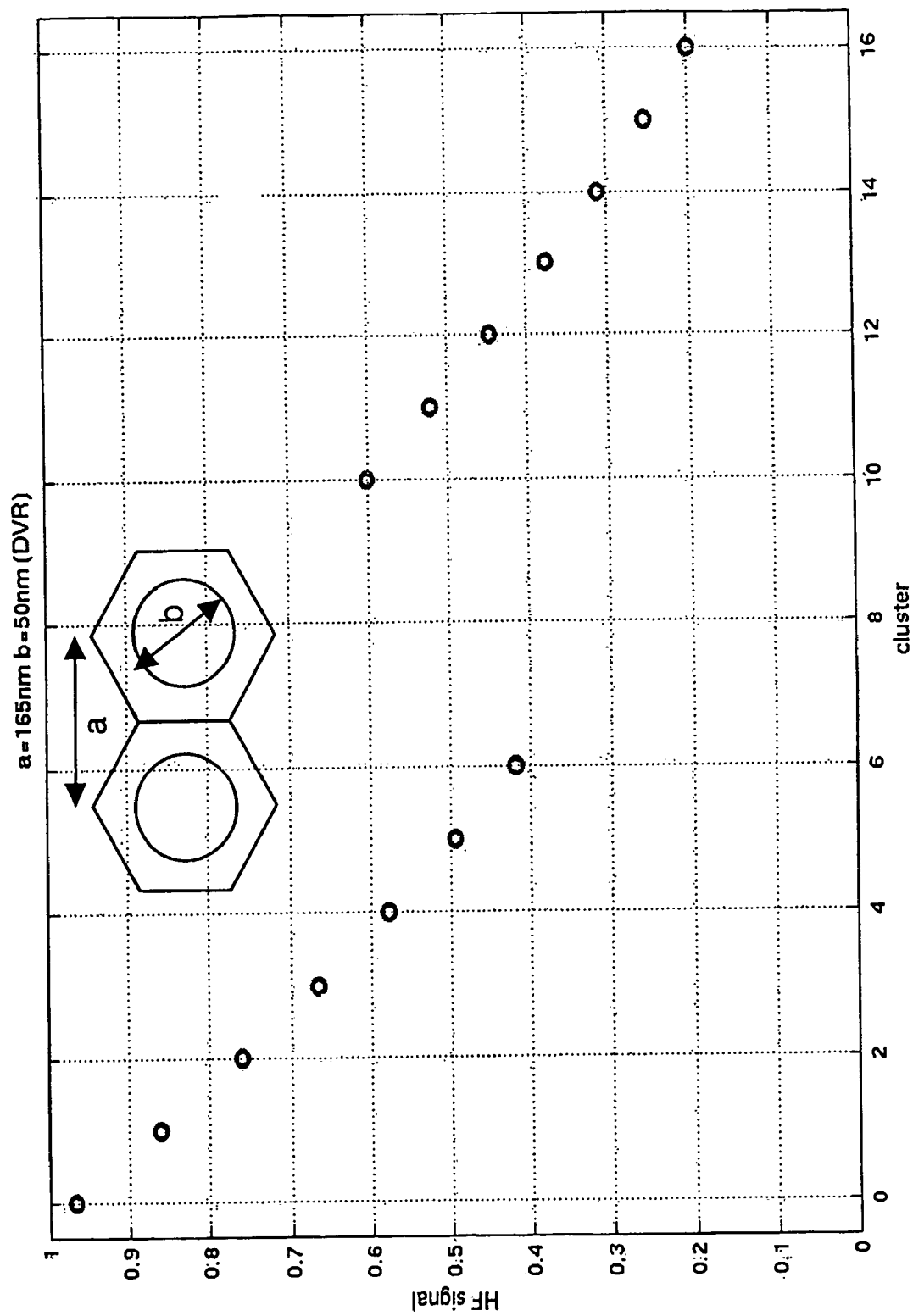
FIGS. 8 to 11 show diagrams indicating the effects of a change in the shape of the incomplete pit effects on the obtained coding level.
Figure 9:
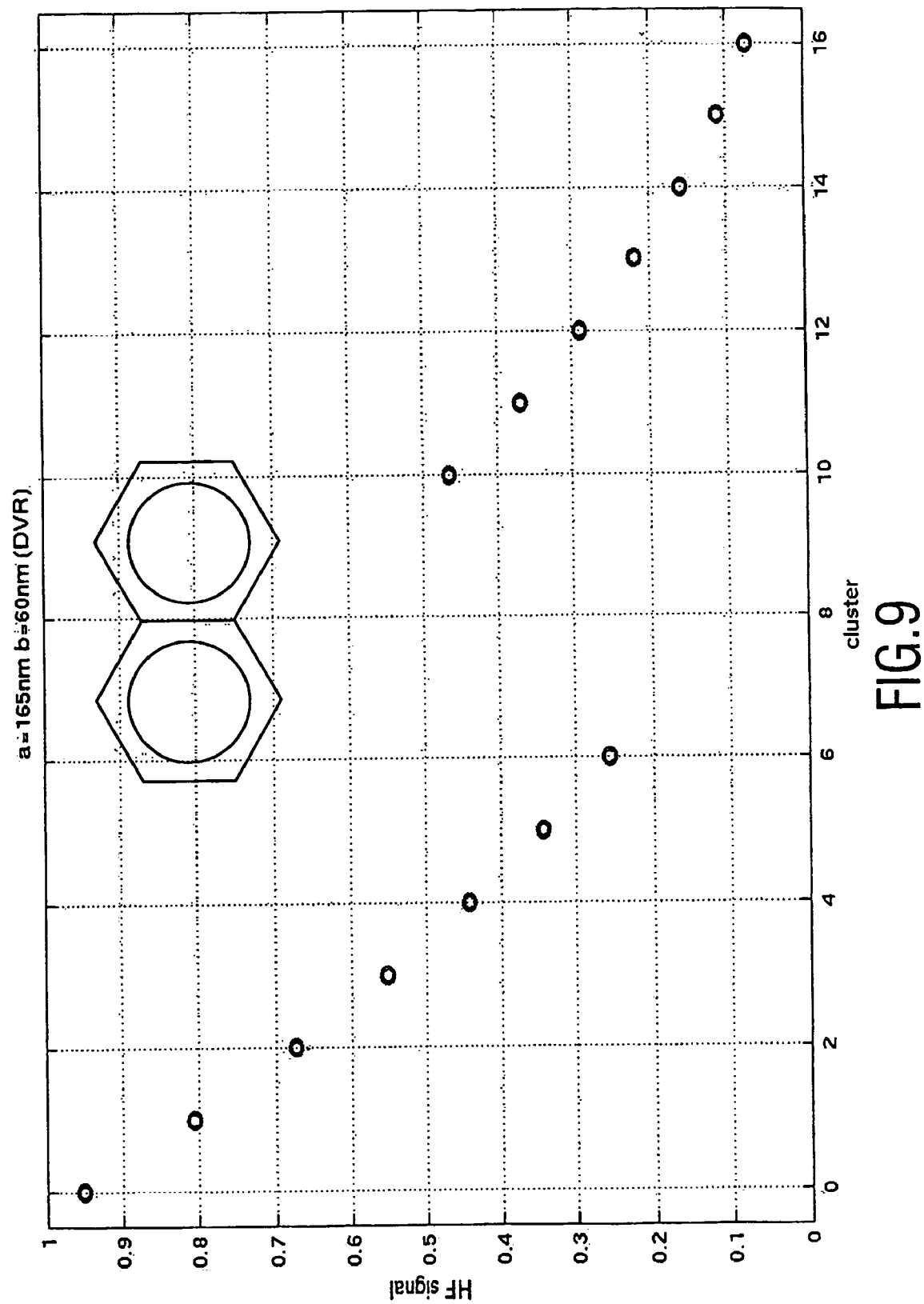
Figure 10:
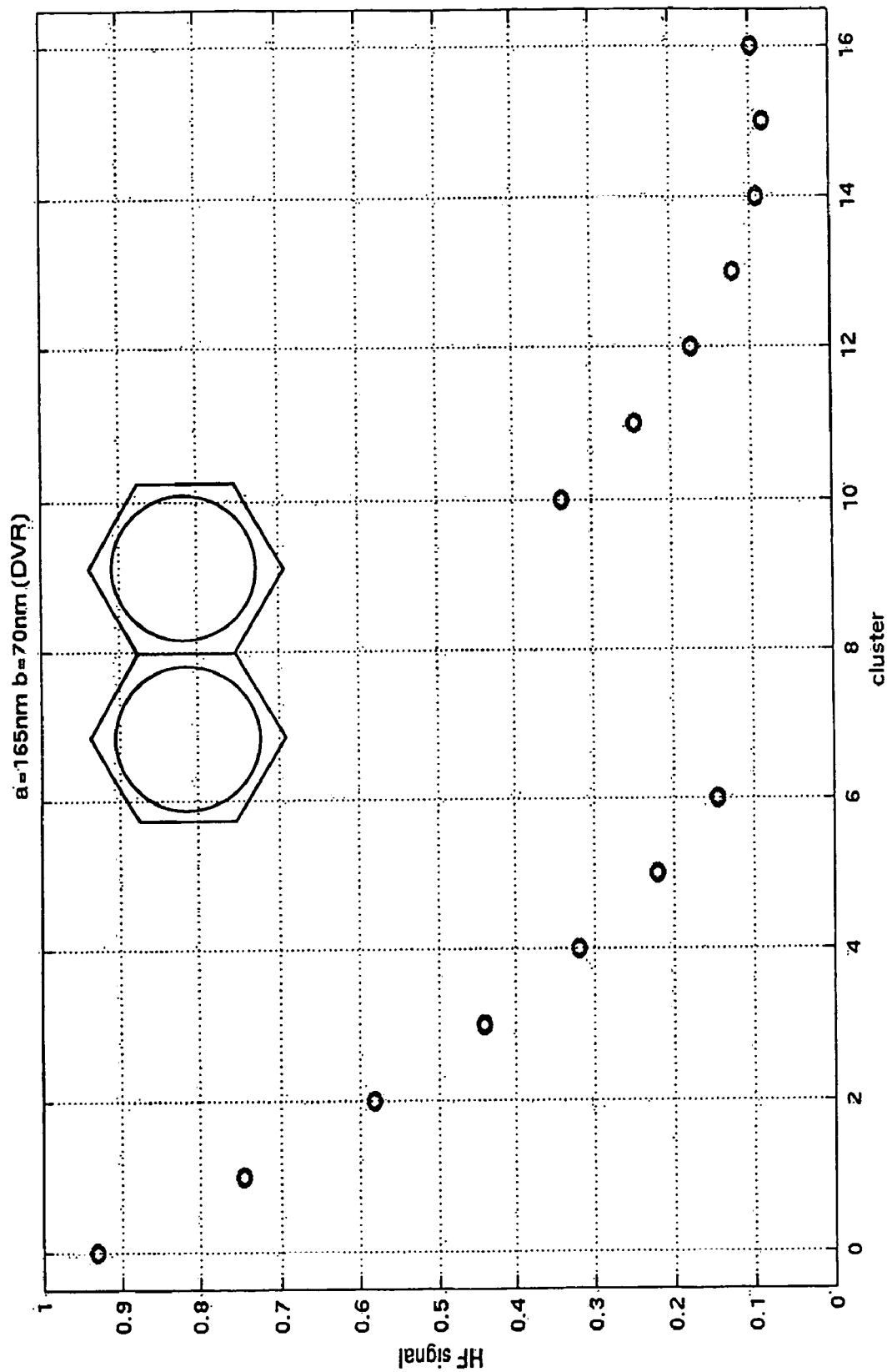

For binary modulation on a 2-D hexagonal lattice, FIG. 7 shows a schematic diagram indicating fourteen different patterns of hexagonal clusters and their respective levels of reflection. In the left group of cluster patterns, the central channel bit CB is set to "0" (i.e. a land effect is arranged in the center), while in the right group of cluster patterns, the central channel bit CB is set to "1" (i.e. an incomplete pit effect is arranged in the center). As can be gathered from FIG. 7, the reflection level decreases with increasing number of incomplete pit effects. Particularly, FIG. 7 indicates signal levels to be expected for binary modulation at a certain disc capacity (increased compared to the 1-D capacity with a substantial factor), where the different signal levels are determined by the number of nearest-neighbouring pit-bits and/or land-bits, which lead to intersymbol-interference at the central bit of the hexagonal clusters drawn. In this way, a multi-level coded information may as well be written by selecting a cluster pattern in accordance with the level of the multi-level coded information to be written.

FIGS. 8 to 11 show the effect of a change in the diameter b of the central pillar portion for the fourteen cluster patterns of FIG. 7 in case of a distance a=165 nm and a DVR (Digital Video Recording) read-out equipment ($\lambda$=405 nm, NA=0.85). This corresponds to an increased capacity compared to 1-D-DVR (code rate ⅔; channel bit length=75 nm; track pitch=320 nm) with a factor of 1.40×(assuming a broad spiral of 11 tracks with a guard band of a single bit row, leading to an efficiency of 11/12). In particular an increased signal folding is apparent in FIG. 11. The horizontal axis indicates cluster pattern numbers representing the clusters of FIG. 7, while the vertical axis indicates the relative HF signal level of the read-out signal in relation to the maximum reflection level. The HF signal levels have been obtained by (very realistic) scalar diffraction calculations. In particular, the cluster pattern numbers 0 to 6 correspond to the left group of clusters shown in FIG. 7, i.e. the cluster patterns with a land effect in the center, while the cluster pattern numbers 10 to 16 correspond to the right group of clusters shown in FIG. 7, i.e. the cluster patterns with an incomplete pit effect in the center.

In FIGS. 8 to 11, the diameter b has been set to 50 nm, 60 nm, 70 nm and 82.5 nm, respectively. The results of FIG. 8 indicate a nearly linear behavior of the reflection level over the whole range of cluster patterns. Thus, a good control of the reflection level by the number of incomplete pit effects can be achieved for both pattern groups. Moreover, both pattern groups show a behaviour with a highest possible similarity, reducing the effect of pit-land assymetry which is typical in any optical recording. The similar behaviour leads also to a similar dependency on the noise in the channel, with respect to detection of both types of bits ("0"-bits, which are land-bits and "1"-bits, which are the incomplete pit-bits). So, in that sense, FIGS. 8 and 9 (without a visible signal folding) are also optimal in terms of identical sensitivity of both types of bits to any channel errors. Further, the signal folding is largely avoided for the conditions of FIGS. 8 and 9, which implies that the overall channel behaves almost linearly. Signal folding is in fact a $2^{nd}$ order channel non-linearity. Avoidance of channel non-linearity is also beneficial for simplicity of detection algorithms and electronics of the receiver (bit-detector). The results of FIGS. 9 and 10 indicate a good performance for the cluster patterns 0 to 6, while the range and linearity is reduced for the cluster patterns 10 to 16. In particular, folding starts at cluster pattern 16 of FIG. 10. The reason therefore is the large total reflection signal obtained by the large total reflection area generated by the sum of the relatively large land portions of each incomplete pit effect within the "all pit cluster".

Figure 11:
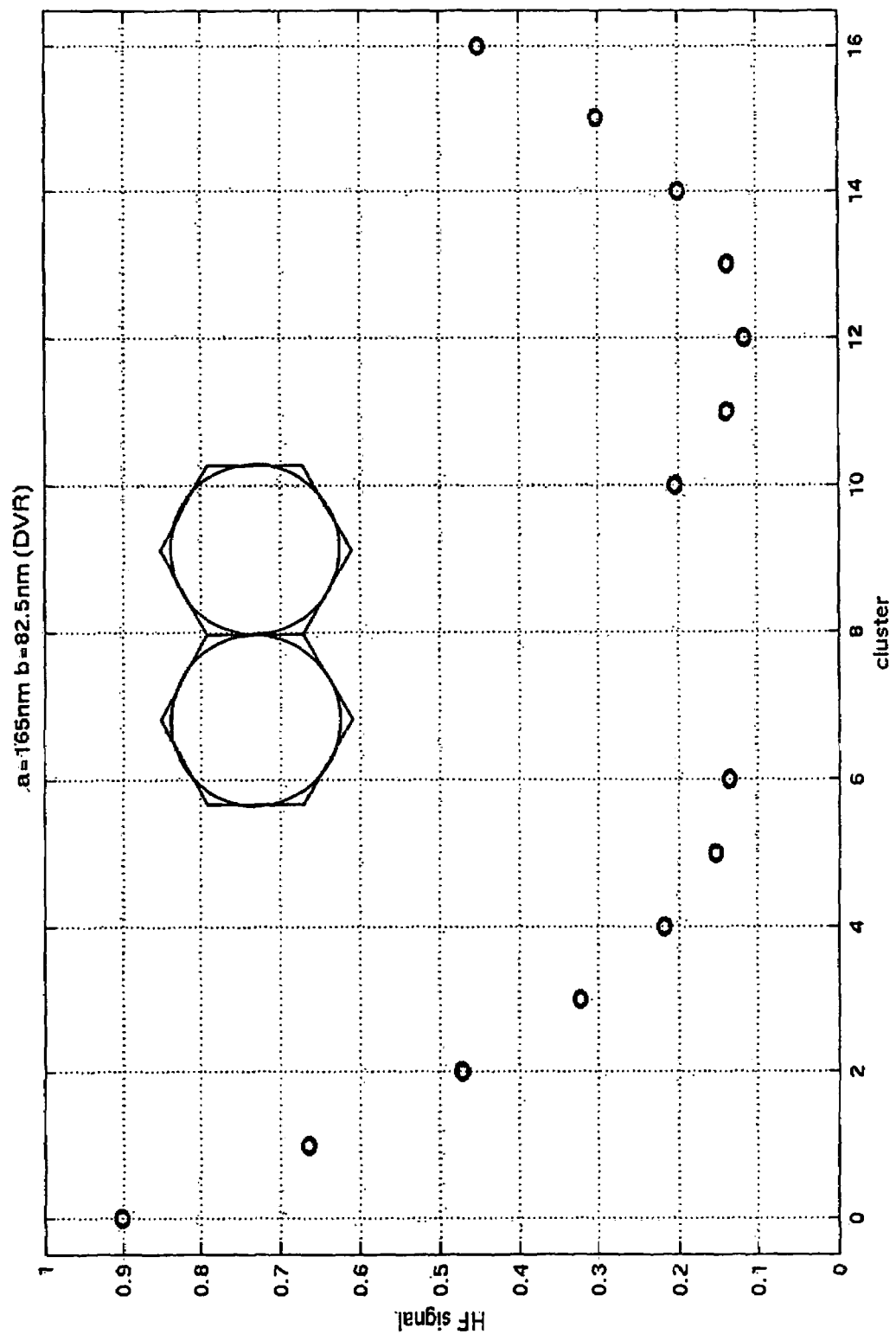

Finally, the results of FIG. 11 indicate that folding occurs in both groups of cluster patterns, i.e. for cluster patterns 6 and 13 to 16. Thus, the diameter of the pillar portion is too large to enable sufficient control.

It is noted, that the described hexagonal-lattice based multi-dimensional coding can be used in any reflection based data storage system. Particularly, the invention is also intended to cover all kinds of record carriers, e.g. optical discs, used in such data storage systems, on which an information is written or stored by using the described multi-dimensional coding scheme. Furthermore, any kind of shape modulation can be used for obtaining incomplete pit effects with a reduced reflection characteristic or an increased diffraction characteristic. Moreover, in re-writable systems, the modulation is not obtained by a physical depth difference between pit-marks and land-marks, but by differences in reflection levels between amorphous areas and poly-crystalline areas. The writing strategy for 2-D writing in phase-change recording can be done along the same lines by changing the shape or structure of the amorphous or poly-crystalline areas, where the pillar or pit-hole in the centre of a pit-bit may correspond to a small amorphous mark. Furthermore, it should be noted that a hole generated in a mastering process may correspond to a pillar on the produced optical disk or card. The invention is thus intended to cover any modification within the scope of the attached claims.

The invention claimed is:

1. A method of writing information to an optical recording medium forming mark areas corresponding to a predetermined state of said information on a recording surface of said optical recording medium, said method comprising the act of adapting said forming step to modulate the shape of said mark areas in a predetermined manner so as to obtain incomplete mark areas which do only partly cover the area of the medium associated with a channel bit to be written, wherein incomplete mark areas are formed by surrounding a non-data area with a data area.

2. A method according to claim 1, comprising the act of modulating said shape of said mark areas to obtain a reduced reflection at said mark area.

3. A method according to claim 2, wherein said mark area is a pit area, the method comprising the act of generating a protruding portion substantially in the center of said pit area.

4. A method according to claim 3, wherein the top region of said protruding portion is adapted to form a land level portion substantially in the center of said pit area.

5. A method according to claim 3, comprising the act of adjusting the size of said protruding portion based on the size of a total pit area formed by adjacent pit areas.

6. A method according to claim 1, wherein said mark area is a pit area, the method comprising the act of generating a hole substantially in the center of said pit area.

7. A method according to claim 6, comprising the act of adjusting the size of said pit hole based on the size of a total pit area formed by adjacent pit areas.

8. A method according to any one of claim 1, comprising the act of forming said incomplete mark area by a focused electron beam or a focused laser beam.

9. A method according to claim 1, wherein said optical recording medium is a phase-change recording medium and said incomplete mark area comprises a small amorphous mark.

10. A method according to claim 1, wherein said optical recording medium is a two-dimensionally encoded medium.

11. A method according to claim 10, comprising the act of arranging said incomplete pit area in a hexagonal grid of a two-dimensional coding scheme.

12. A method according to claim 1, wherein said method is used for mastering a record carrier.

13. A method according to claim 1, wherein said information is a multi-level coded information, the method comprising the act of modulating said shape of said incomplete pit area in accordance with the level of said multi-level coded information.

14. A method according to claim 1, further comprising the act of forming a cluster pattern of said incomplete marks on each channel bit area and controlling the pattern in accordance with the level of a multi-level coded information.

15. An apparatus for writing an information to an optical recording medium by forming mark areas corresponding to a predetermined state of said information on a recording surface of said optical recording medium, said apparatus being adapted to modulate the shape of said mark areas in a predetermined manner so as to obtain incomplete mark areas which do only partly cover the area of the medium associated with a channel bit to be written, wherein incomplete mark areas are formed by surrounding a non-data area with a data area.

16. An apparatus according to claim 15, wherein said mark area is a pit area and said apparatus is arranged to form a pillar portion or a hole within said pit area.

17. An apparatus according to claim 15, wherein said apparatus is arranged to write a multi-level coded information by controlling the shape or number of said incomplete mark areas in accordance with the level of said multi-level coded information.

18. A record carrier on which an information is written in the form of mark areas corresponding to a predetermined state of said information, wherein the shape of said mark areas is modulated in a predetermined manner so as to obtain incomplete mark areas which do only partly cover the area of the medium associated with a channel bit to be written, wherein incomplete mark areas are formed by surrounding a non-data area with a data area.

19. A record carrier according to claim 18, wherein said incomplete mark area is a pit area comprises a pillar portion or a hole.

20. A record carrier according to claim 18, wherein said information is a multi-level coded information, and wherein the shape or number of said incomplete mark areas defines a level of said multi-level coded information.

21. A method of writing an information to an optical recording medium by forming mark areas corresponding to a predetermined state of said information on a recording surface of said optical recording medium, said method comprising the step of adapting said forming step to modulate the shape of said mark areas in a predetermined manner so as to obtain incomplete mark areas which do only partly cover the area of the medium associated with a channel bit to be written, wherein said mark area is a pit area, and a protruding portion is generated substantially in the center of said pit area, and wherein the size of said protruding portion is adjusted based on the size of a total pit area formed by adjacent pit areas.

22. A method of writing an information to an optical recording medium by forming mark areas corresponding to a predetermined state of said information on a recording surface of said optical recording medium, said method comprising the step of adapting said forming step to modulate the shape of said mark areas in a predetermined manner so as to obtain incomplete mark areas which do only partly cover the area of the medium associated with a channel bit to be written, wherein said mark area is a pit area, and a hole is generated substantially in the center of said pit area, and wherein the size of said pit hole is adjusted based on the size of a total pit area formed by adjacent pit areas.

* * * * *